United States Patent
Lederer et al.

(10) Patent No.: US 9,560,942 B2
(45) Date of Patent: Feb. 7, 2017

(54) PORTABLE TOILET HAVING A TILTING BOWL WITH POUR SPOUT

(71) Applicant: Eugene G. Lederer, Los Angeles, CA (US)

(72) Inventors: Eugene G. Lederer, Los Angeles, CA (US); Stefan A. Jeler, Los Angeles, CA (US)

(73) Assignee: Eugene G. Lederer, Los Angeles, CA (US)

( * ) Notice: Subject to any disclaimer, the term of this patent is extended or adjusted under 35 U.S.C. 154(b) by 0 days.

(21) Appl. No.: 15/173,472

(22) Filed: Jun. 3, 2016

(65) Prior Publication Data

US 2016/0353950 A1    Dec. 8, 2016

Related U.S. Application Data

(60) Provisional application No. 62/170,635, filed on Jun. 3, 2015.

(51) Int. Cl.
  *A47K 17/00* (2006.01)
  *A47K 11/04* (2006.01)
  *A47K 11/02* (2006.01)

(52) U.S. Cl.
  CPC .............. *A47K 17/00* (2013.01); *A47K 11/02* (2013.01); *A47K 11/04* (2013.01)

(58) Field of Classification Search
  CPC .......... A47K 11/02; A47K 11/04; A47K 17/00
  USPC .... 4/420, 429, 449, 467, 479, 480, 483, 667
  See application file for complete search history.

(56) References Cited

U.S. PATENT DOCUMENTS

| | | | |
|---|---|---|---|
| 8,584,270 B2 * | 11/2013 | Rosser | A47K 11/04 4/483 |
| 8,627,518 B1 * | 1/2014 | Lederer | A47K 11/04 4/466 |
| 8,978,173 B1 * | 3/2015 | Lederer | A47K 11/04 4/667 |

* cited by examiner

*Primary Examiner* — Tuan N Nguyen
(74) *Attorney, Agent, or Firm* — Mark W Handley (57) ABSTRACT

A portable toilet has a seat and a waste receptacle mounted to a frame to allow use as a toilet in conventional fashion. The waste receptacle is pivotally mounted to the frame to allow the forward end of the receptacle to be lifted to spill the contents into a conventional building toilet. A pour spout extends from a rearward end of the waste receptacle. The frame, seat and the waste receptacle are configured to place the waste receptacle at a proper height for personal use and for pivoting the waste receptacle to spill the contents thereof into the conventional building toilet. A water flush system is provided which includes a water supply and nozzles mounted to the waste receptacle for cleaning the contents there-from. The water supply may be provided by connecting to a building water faucet, or by mounting a tank and pump to the portable toilet.

18 Claims, 9 Drawing Sheets

PORTABLE TOILET HAVING A TILTING BOWL WITH POUR SPOUT

CROSS-REFERENCE TO RELATED APPLICATIONS

The present application is a conversion to a regular utility application of U.S. Provisional Patent Application Ser. No. 62/170,635, filed Jun. 3, 2015, and invented by Eugene G. Lederer and Stefan A. Jeler.

TECHNICAL FIELD OF THE INVENTION

The present invention relates in general to portable toilets, and in particular to a portable toilet for bedside use which provides for easy cleaning by care givers.

BACKGROUND OF THE INVENTION

Prior art portable toilets which have been provided for bedside use are typically cleaned by an attendant or care giver, usually requiring the emptying of pans or bowls. In hospitals a portable toilet has been provided by a bench having a hole in the seat for receipt of a bowl used for receiving waste. After use, the bowl must be removed, emptied, and then cleaned by the attendant or care giver. Portable toilets have also been provided by chairs or stools having a hole in the seat for receiving a receptacle bag which is disposed of after use, requiring the attendant or the care giver to remove the bag for disposal. An alternative is desired which reduces the need for an attendant or a care giver to handle waste for disposal. One example of a portable toilet is U.S. Pat. No. 8,627,518 invented by Eugene G. Lederer et al.

SUMMARY OF THE INVENTION

A portable toilet has a seat, a lid and a waste receptacle mounted to a frame to allow use as a toilet in conventional fashion. The waste receptacle is pivotally mounted to the frame to allow the forward end of the receptacle to be lifted to spill the contents into a conventional building toilet. A pour spout extends from a rearward end of the waste receptacle. A water flush system is provided which includes a water supply and nozzles mounted to the waste receptacle for cleaning the contents there-from. The waste receptacle and a seat are at an angle to the horizontal, with increasing height in a rearward direction, so that the pivot potion of the seat and the waste receptacle will be taller than the front of the conventional building toilet to allow the waste receptacle to tilt above the front of the conventional building toilet and spill the contents of the waste receptacle into the building toilet. The water supply may be provided by connecting to a building water faucet, or by mounting a tank and pump to the portable toilet. A water spray gun is also provided for connecting to a building water facet for cleaning debris from the waste receptacle. In a second embodiment, a mechanical mechanism is provided for maintaining an upper surface of the waste receptacle in a horizontal position when raised to align for spilling waste into a building toilet, preferably by a scissor style linkage assembly. Either embodiment for a portable toilet may be operated manually, powered by hand, or automatically operated by pressing a control button to power a linear actuator or other device to automatically spill the contents of the waste receptacle and operate a cleaning spray.

DESCRIPTION OF THE DRAWINGS

For a more complete understanding of the present invention and the advantages thereof, reference is now made to the following description taken in conjunction with the accompanying Drawings in which FIGS. 1 through 21 show various aspects for portable toilet having tilting bowl with pour spout made according to the present disclosure as set forth below:

DETAILED DESCRIPTION OF THE INVENTION

Figure 1:
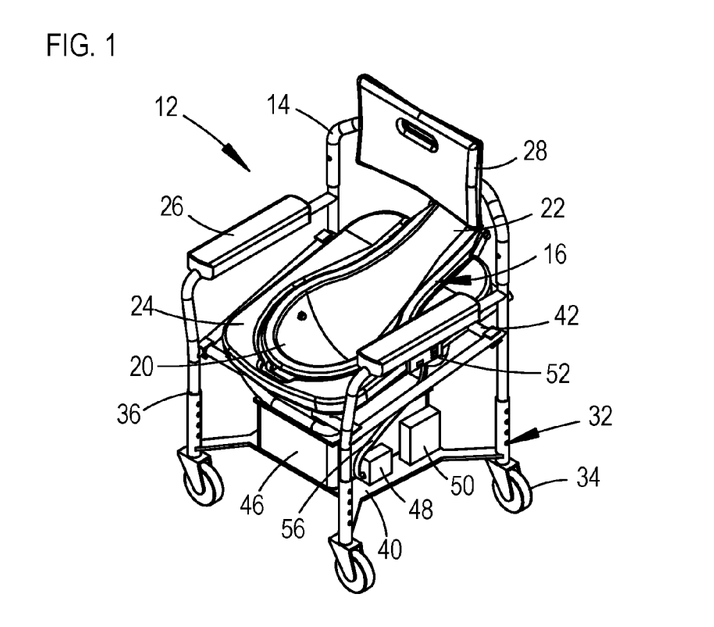
FIG. 1 is perspective view of a portable toilet shown configured for personal use, with a waste receptacle defining a bowl located in a downward position.

FIG. 1 is perspective view of a portable toilet 12 shown configured for personal use, with a waste receptacle 12 located in a downward position. The portable toilet 12 has a frame 14 to which the waste receptacle 16 is pivotally mounted for moving from a downward position shown in FIG. 1 to an upward position shown in FIGS. 2 and 3. The waste receptacle 12 has a bowl 20 and a pour spout 22 for passing the contents of bowl 20 when the waste receptacle is disposed in the upward position. A seat 24 extends along three sides of the waste receptacle 12 when the waste receptacle is disposed in the downward position. The seat 24 is preferably mounted in a fixed position relative to the frame 14. Arm rests 26 and a back rest 28 are provided in conventional proximity to the seat 24. A base 32 is provided as part of the frame 14 and has optional wheels 34, which preferably lock into fixed angular positions, and height adjustable legs 36 and 38. A support frame 42 is mounted to the frame 14 for supporting the seat 24. The base 32 has a mounting plate 40 to which a tank 46 is provided. The tank 46 provides a fluid reservoir for storing and supplying water or another cleaning fluid. A pump 48 and control unit 50 are mounted to the plate 40, preferably disposed in separate housings. The control unit 50 will preferably include a storage battery for powering electrical devices on the portable toilet 12. A supply tube 56 runs from the pump 46 to transfer water or other liquid cleaning solutions from the pump 46 to spray nozzles 60 mounted in the bowl 20 of the waste receptacle 16.

Figure 2:
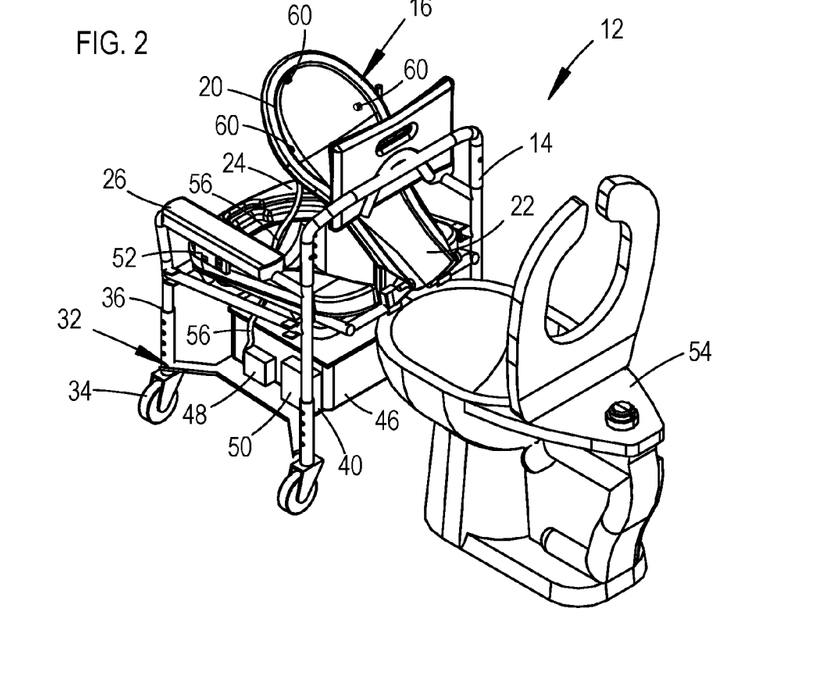
FIG. 2 is perspective view showing the portable toilet located in front of a conventional fixed building toilet, with the waste receptacle disposed in raised or lifted position with the waste receptacle rotated to spill the contents of the waste receptacle into the conventional building toilet.
Figure 3:
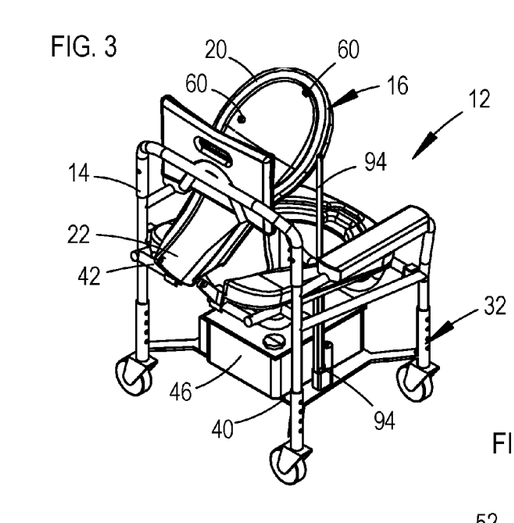
FIG. 3 is perspective view of the portable toilet shown with the waste receptacle disposed in raised or lifted position, rotated to spill the contents therefrom.

FIG. 2 is perspective view showing the portable toilet 12 located in front of a conventional fixed building toilet 54, with the waste receptacle 16 disposed in raised or lifted position with the waste receptacle 16 rotated to spill the contents of the waste receptacle into the conventional building toilet 54. FIG. 3 is perspective view of the portable toilet 12 shown with the waste receptacle 16 disposed in raised or lifted position, rotated to spill the contents therefrom. In manual operation, a user will manually lift the forward end of the waste receptacle 16 to the upwards position which spills the contents of the bowl 20 through the pour spout 22 and into the building toilet 54. When the portable toilet 12 is configured for automatically emptying the contents of the bowl 20, a linear actuator 94 is electrically powered to move the waste receptacle between the upward and downward positions.

Figure 4:
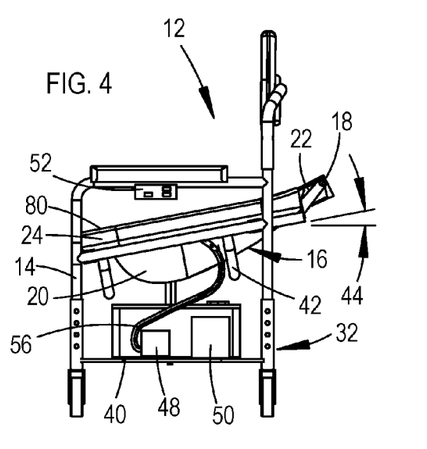
FIG. 4 is a side elevation view of the portable toilet disposed in the downward position ready for use.
Figure 5:
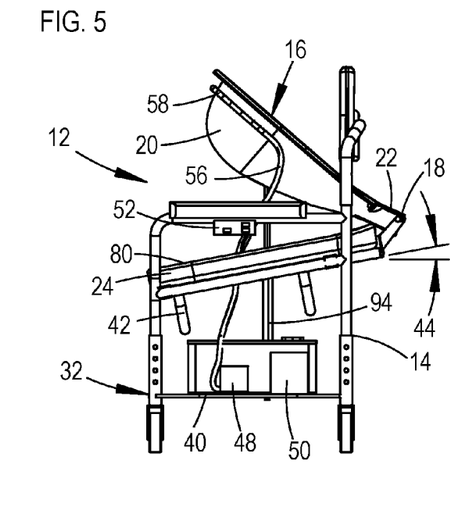
FIG. 5 is side elevation view showing the portable toilet located in the raised or lifted position with the waste receptacle rotated to spill the contents of the waste receptacle into a conventional building toilet.

FIG. 4 is a side elevation view of the portable toilet 12 with the waste receptacle 16 disposed in the downward position ready for personal use, and FIG. 5 is side elevation view showing the portable toilet 12 located in the raised or lifted position with the waste receptacle 16 rotated to spill the contents of the waste receptacle 16 into a conventional building toilet 54 (shown in FIG. 2). The upper surface 80 of the seat 24 and the waste receptacle 16 are mounted at an angle 44 to the horizontal, with the height increasing in a rearward direction to position the pivot point defined by the axis 18 above the height of the forward end of the building toilet 54 to allow the waste receptacle 16 to pivot, or tilt, and spill the contents of the bowl 20 into the toilet 54. The angle 44 also allows the forward end of the upper surface 80 of the seat 24 and the waste receptacle 16 to be of a height for easily accessing for personal use, such that a user may easily sit upon the seat 24. The angle 44 may range from zero to fifteen degrees from horizontal. The seat angle 44 for the portable faucet is preferably twelve degrees.

Figure 6:
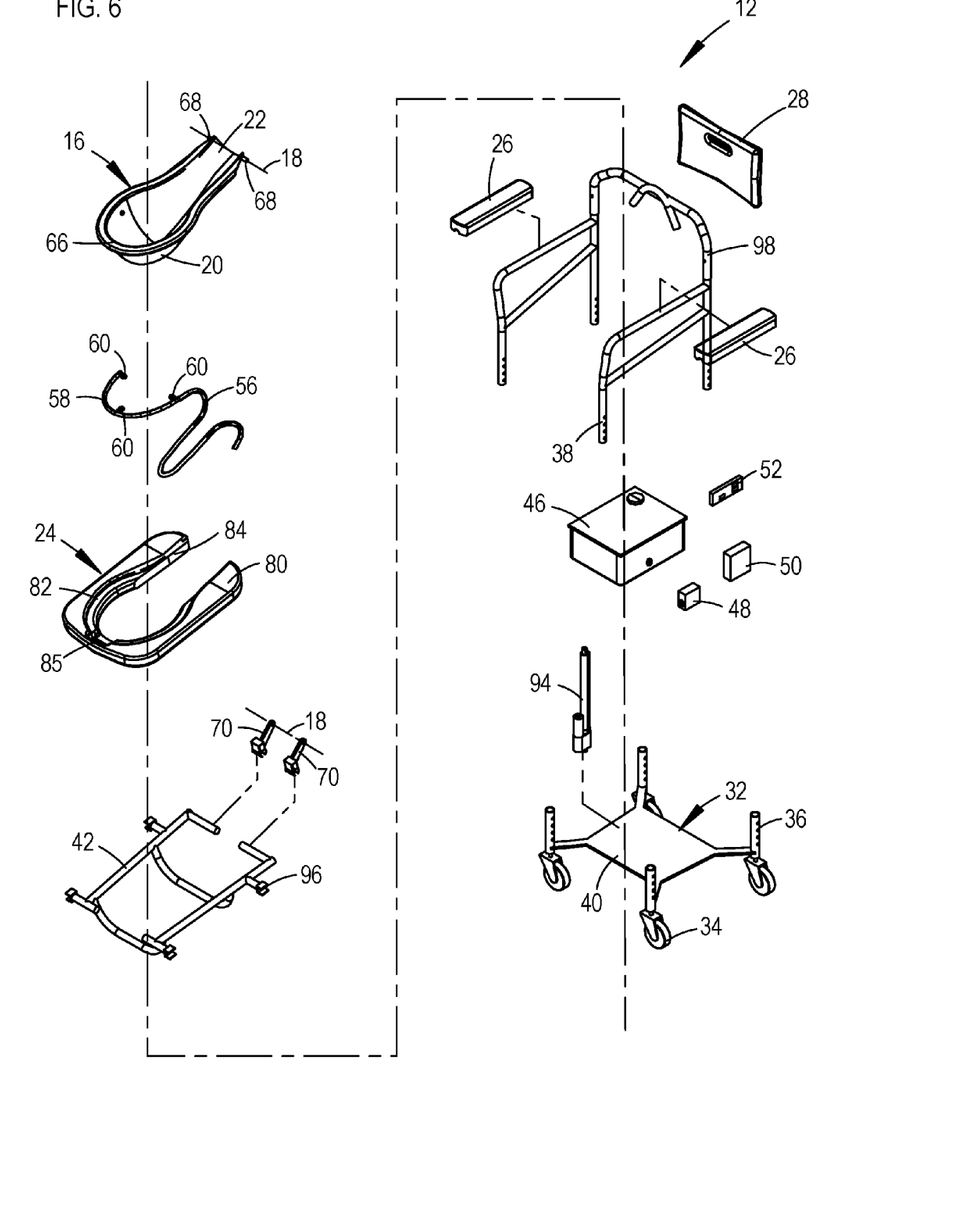
FIG. 6 is an exploded, perspective view of the portable toilet showing the component parts thereof.

FIG. 6 is an exploded, perspective view of the portable toilet 12 showing the various component parts thereof. The waste receptacle 16 is shown having a bowl portion 20 and a pour spout portion 22. Two pivot pins 68 extend from opposite sides of a rearward end of the waste receptacle 16, defining an axis 18 at the rearward end of the waste receptacle 16, preferably adjacent to the rearward terminal end of the pour spout 22. The waste receptacle 16 pivots about the axis 18 when being tilted to spill the contents therefrom. The upper surface of the waste receptacle 16 defines a flanged edge 66 for the bowl portion 20, which fits into a recess 82 in the upper facing surface of the seat 22.

A supply manifold 58 defines a header which is connected to the spray nozzles 60, in fluid communication therewith for passing water or another cleaning solution from a supply tube 56 to the spray nozzles 60. Preferably there are three of the spray nozzles 60 for mounting to the bowl portion 20 of the waster receptacle 16, but another number may be provided. The spray nozzles 60 preferably define orifices which provide flow restrictions, such that the pressure of the water or other cleaning solution within the manifold 58 will be substantially constant across the length of the manifold 57. The manifold 58 is preferably provided by tubing connected to the flow nozzles 60 by conventional pipe fittings, either threaded, compression, glued or soldered socket type, or a combination thereof, such as pipe tees and elbows. In other embodiments, the nozzles 60 may be mounted directly into the manifold 58, or the manifold 58 may be formed as an integral part of the waste receptacle 16. The supply tubing 56 is preferably a hose, plastic tubing, rigid piping, or the like which connects to the tank 46, but flexibility or other accommodation should be provided to allow pivoting of the waste receptacle 16 while connected between the tank 16 and the waste receptacle 16.

The seat 24 is provided for supporting a person making personal use of the portable toilet 12. The seat 24 preferably has a flat upper surface 80, and a central edge opening 84 which extends from a rearward terminal end of the seat 24 to a forward portion of the seat 24 for receipt of the waste receptacle 16. The recess 82 extends into the flat upper surface 80 of the seat 24 for fittingly engaging and receiving the flanged edge 66 of the bowl 20 of the waste receptacle 16 and supporting the waste receptacle 16 when disposed in a downward position. The forward portion of the upper surface 80 of the seat 24 preferably has a notch 85 adjacent to the recess 82 and the opening 84 to allow a person emptying the contents of the waste receptacle 16 to place a hand for gripping the forward end of the waste receptacle 16 during manual operations to empty the contents of the bowl 20 of the waste receptacle 16.

A support frame 42 is preferably a tubular metal weldment provided for supporting the seat 24 under the weight of a person. The seat 24 is preferably mounted directly to the support frame 24. The waste receptacle 16 is preferably also pivotally mounted to the support frame 42 by means of two mounting brackets 70. The two mounting brackets 70 locate the axis 80 about which the waste receptacle 16 rotates relative to the seat 24, the frame 14 and the portable toilet 12. The two mounting bracket 70 have hinge loops 74 (shown in FIG. 9) for receiving the pivot pins 68 about which the waste receptacle 16 rotates. Mounts 96 are provided for fixedly securing the support frame 42 to a fixed support structure 98 of the frame 14.

The fixed support structure 98 is preferably a tubular weldment to which the support frame 42 is secured in fixed relation. Two arm rests and a back rest 28 are mounted to the weldment 98. Two lower legs 38 extend for being received within legs 36 to together define height adjustable legs for the portable toilet. Fastener pins (not shown) are preferably used for aligning within selected holds in the legs 36 and 38 to determine the height of the frame 14 of the portable toilet 12. A base 32 is provided by the legs 36 and a mounting plate 40. The legs 36 are spaced apart relative to opposite corners of the mounting plate 40 of the base 32. Wheels 34 are preferably provided by roller castors, and are preferably of the type which may be locked into fixed angular positions to prevent the portable toilet 12 from rolling away for a user during person use and during emptying of the waste receptacle 16. In some embodiments, wheels 34 may not be included. A linear actuator 94 is mounted to the mounting plate 40 for operating to selectively move the waste receptacle between downward and upward positions in response to a user accessing a control panel 52. The linear actuator is preferably powered by direct current electricity to allow powering by batteries. The control panel 52 is the same as control panel 230, discussed below in reference to FIG. 16.

A water or other type cleaning fluid supply tank 46 is mounted on the mounting plate 40. A pump housing and pump 48 are mounted to the mounting plate 40 adjacent to the tank 46. The pump is preferably electrically powered by direct current to allow powering by batteries. A control unit 50 with power supply is mounted to the mounting plate 40. The control unit 50 includes a housing, a power supply such as a rechargeable battery located in the housing, and one or more connectors for connecting to the pump 48, the control panel 52, and the linear actuator 94 to control operation of the portable toilet 12 in automatic and in manual modes or operation. In some embodiments, building power may be used to power operation of the portable toilet 12 or to charge the battery included in the control unit 50. The supply tank 46 preferably has a sight glass (not shown) or is made or has as clear sidewall so that a user may see the fluid level in the tank 46. The supply tank 46 may be filled from a conventional building water faucet using an open funnel connected to tubing which is inserted into an aperture preferably located in the top of the supply tank 46. Alternatively, the faucet adapter 160, elastic loop 161, and tubing 158 shown in FIG. 20 may be used for filling the supply tank 46.

Figures 7, 8:
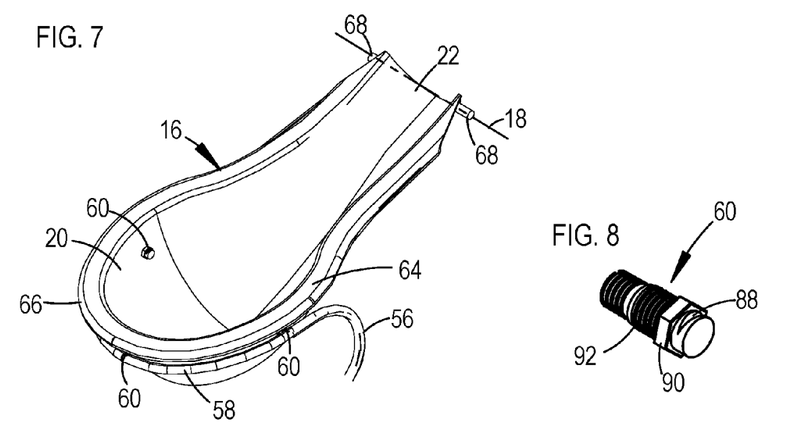
FIG. 7 is a perspective view of the waste receptacle showing flow nozzles disposed in flow ports which are spaced apart to extend through the sidewall of the bowl, for supplying fluid for rinsing waste from the bowl of the waste receptacle.
FIG. 8 is a perspective view of one of the flow nozzles for supplying fluids to rinse debris from the bowl of the waste receptacle.

FIG. 7 is a perspective view of the waste receptacle 16 showing spray nozzles 60 disposed in ports which are spaced apart to extend through the sidewall of the bowl portion 20. A rearward end of the waste receptacle 16 has two posts 68 which extend from a rearward-most end of the waste receptacle 16. The two posts 68 are rotatably received within respective ones of hinge loops 74 for the bowl mounting brackets 70. An opposed end of the bowl mounting brackets 70 have frame tube connectors 76 for fixedly securing to the frame 14. The supply manifold 58, preferably formed of plastic tubing, is shown extending around a forward end of the waste receptacle 16, with the nozzles 60 secured to the manifold 58 and the waste receptacle 16. The bowl 20 has an enlarged portion 64, and a flanged edge 66.

FIG. 8 is a perspective view of one of the spray nozzles 60 for supplying fluids to rinse debris from the bowl 20 of the waste receptacle 16. The spray nozzles 60 each have a nozzle orifice 88, a mounting flange 90 and a threaded end 92. The flange 90 is configured to fit against an interior side of sidewall of the bowl 20, with the threaded end 92 protruding through the sidewall for securing to a fitting or a manifold, such as the supply header 58. The supply header 58 is preferably formed of tubing which connects between the shown fittings.

Figure 9:
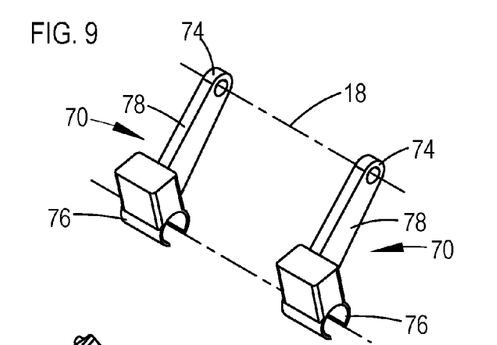
FIG. 9 is a perspective view of two mounting brackets which pivotally secure the waste receptacle to the frame.

FIG. 9 is a perspective view of two bowl mounting brackets 70 which pivotally secure the waste receptacle 16 to the frame 14. The mounting brackets 70 have first ends which include frame tube connectors 76 that fixedly secure the brackets 70 to the frame 14. Second ends of the mounting brackets 70 define hinge loops 74 for rotatably receiving the pivot pins 68 of the waste receptacle 16 to pivotally secure the waste receptacle to the frame 14 for rotating about the axis 18. Support arms 78 extend between the hinge loops 74 and the frame tube connectors 76, suspending the hinge loops 74 behind the frame 14, such that the terminal end of the pour spout 22 extends behind the frame 14.

Figure 10:
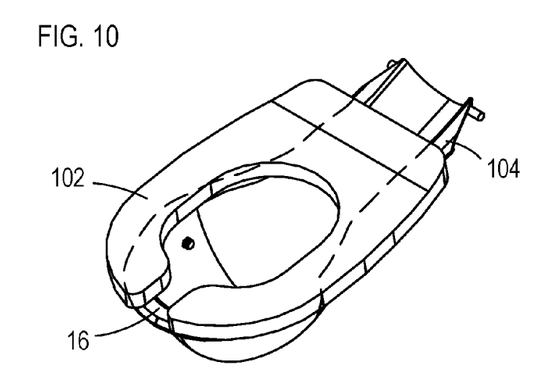
FIG. 10 is a perspective view of a conventional toilet seat mounted atop the waste receptacle for use in an additional embodiment of the present disclosure.

FIG. 10 is a perspective view of a conventional toilet seat 102 mounted atop the waste receptacle 16. The toilet set 102 is an optional feature. The toilet seat 102 is mounted to the waste receptacle 16 at a flange portion 104, either by threaded fasteners or the like, and may in some embodiments be hinged.

Figures 11, 12, 13:
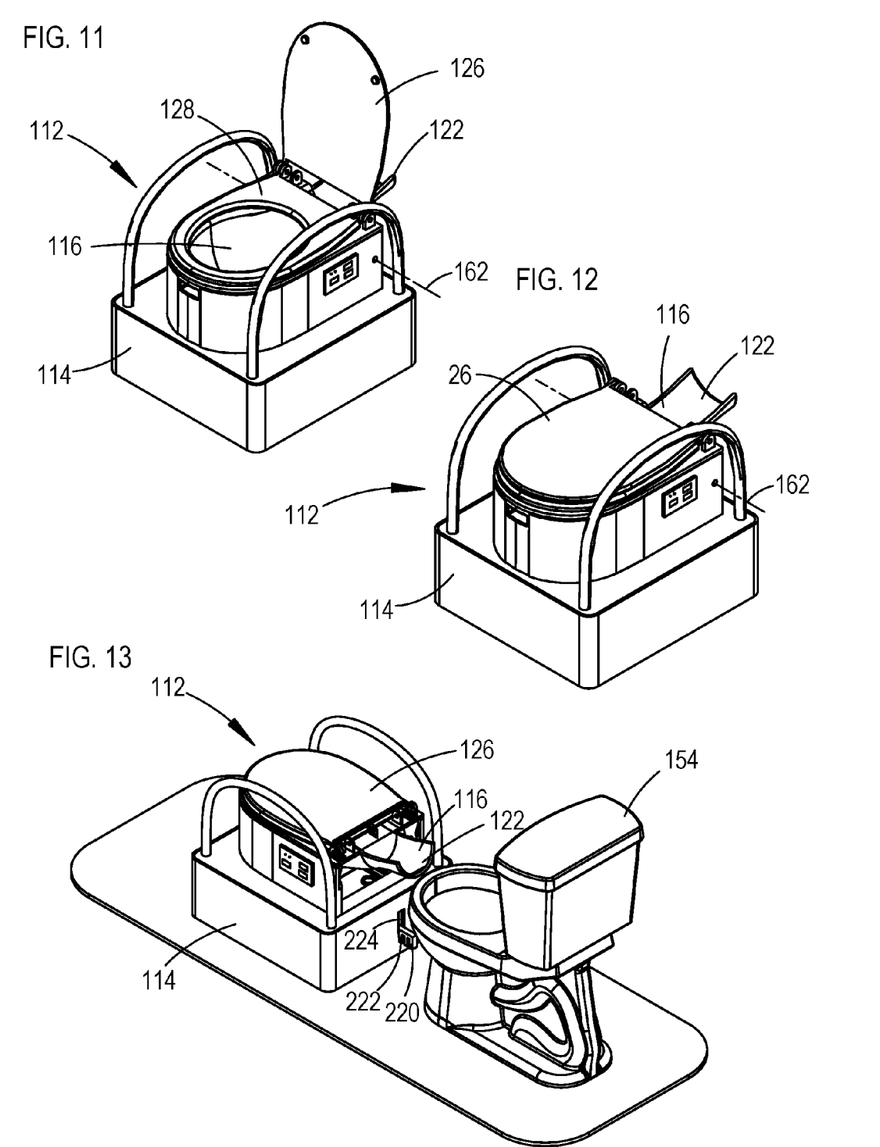
FIG. 11 is perspective view of second embodiment of the present disclosure, a portable toilet which is shown with a seat located in a downward position and a lid disposed in an upward, open position.
FIG. 12 is perspective view of the portable toilet shown with a lid disposed in a downward, closed position.
FIG. 13 is perspective view of the portable toilet shown disposed in front of a conventional fixed toilet for a building.
Figure 15:
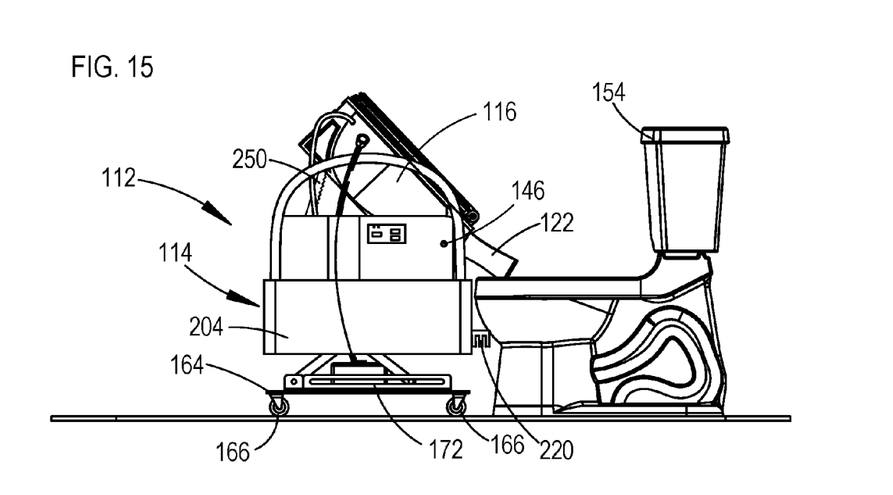
FIG. 15 is side elevation view showing the portable toilet in a raised or lifted position with the waste receptacle rotated to spill the contents of the waste receptacle into the conventional building toilet.

FIG. 11 is perspective view of a second embodiment of the present disclosure, a portable toilet 112 which is shown with a seat 128 disposed in a downward position and a lid 126 disposed in an upward, open position. FIG. 12 is perspective view of the portable toilet 112 shown with a lid 126 disposed in a downward, closed position. FIG. 13 is perspective view of the portable toilet 112 shown disposed in front of a conventional fixed toilet 154 for a building. The portable toilet 112 has a frame 114 to which is pivotally mounted a waste receptacle 116. The rearward end of the waste receptacle 116 has a pour spout 122. A stop 220 is mounted in a stop slot 224 to provide a spacer for spacing the rearward end of the portable toilet away from the conventional building toilet. The stop 220 has a plurality of teeth 222, two of which fit on opposite sides of a lower edge of the stop slot 224 to lock the stop 220 into position rearwardly extending from the enclosure 204. The two of the teeth 222 of the stop 220 are selectively placed on opposite sides of the lower end of the rearward edge of the stop slot 224 to lock the stop 220 to extend a user selected distance from the rearward sidewall 210 of the housing enclosure 204. The stop 220 will engage the forward end of a building toilet 154 to dispose the portable toilet at a selected distance for emptying the waste receptacle into the building toilet 154 as shown in FIG. 15. The stop 220 is shown in more detail in FIG. 16.

Figure 14:
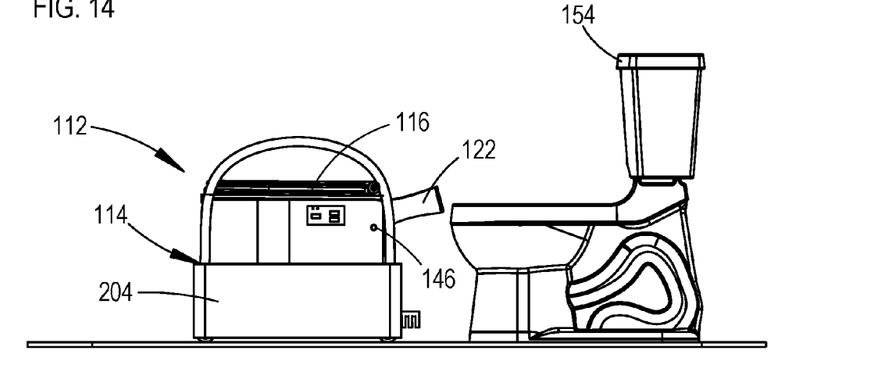
FIG. 14 is a side elevation view of the portable toilet disposed in front of a conventional building toilet.

FIG. 14 is a side elevation view of the portable toilet 112 disposed in front of a conventional building toilet 154. FIG. 15 is side elevation view showing the portable toilet 112 in a raised or lifted position, with the waste receptacle 116 rotated to spill the contents of the waste receptacle 116 into the conventional building toilet 154.

Figure 16:
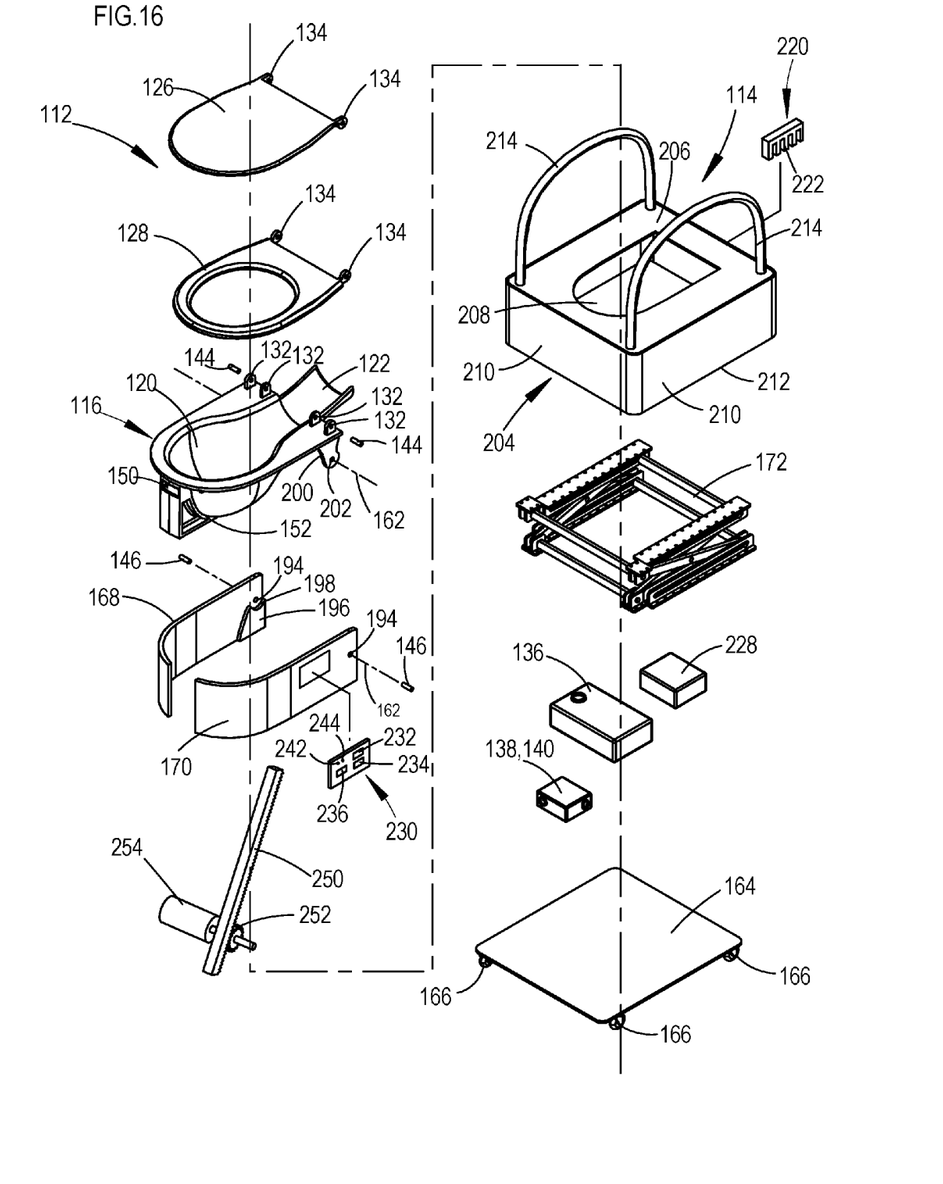
FIG. 16 is an exploded, perspective view of the portable toilet.

FIG. 16 is an exploded view of the portable toilet 112 showing the receptacle 116 above a frame 114 to which the receptacle 116 is pivotally mounted by means of two hinge pins 146 which are rotatably received within respective hinge pin apertures 194 and 202. A reinforced region 152 is provided in a forward portion of the waste receptacle 116. The waste receptacle 116 has a central portion defining a bowl 120. A pour spout 122 extends outward from a rearward end of the bowl 120. The bowl 120 has an enclosed lower end and open upper end for receiving waste during use. The pour spout 122 allows the waste disposed within the bowl 120 to be poured into a conventional building toilet 154. Hinge loops 134 are provided in the lid 126 and the seat 128 for pivotally mounting to the hinge loops 132 of the receptacle 116 with hinge pins 144. A lift system for raising the forward end of the bowl 120 is provided by a rack 250, pinion gear 250 and electric drive motor 254, preferably a stepper motor. Micro-switches (not shown) are preferably also included to provide proximity sensors for defining stop positions in the fully tilted position and the fully lowered position.

A control unit 228 and a control panel 230 provide manual control for raising and lowering the forward end of the bowl 120, and for the raising and lowering the scissor lift mechanism 172. The control panel 230 has an up and down control toggle button 232 for controlling actuation of a linear actuator 246 (shown in FIG. 17) for raising and lowering the scissor lift mechanism 172. A tilt or empty button 234 is provided for controlling operation of the electric motor 254 to raise the forward end of the bowl 120 to tilt the bowl 120 and empty its contents. A water flow button 236 provides for manual control of passing water through the flow nozzles 142 for cleaning the bowl 120 and for filling the bowl 120 to a fill line 240 (shown in FIG. 21).

The frame 114 includes a platform 164 having wheels 166, a scissor style linkage assembly 172 providing a mechanical linkage mechanism, an enclosure 204 defining a housing for the linkage assembly 172, and two support brackets 168 and 170 which are mounted in opposed relation, in fixed positions atop the enclosure 204 by means of ninety degree metal brackets, not shown. The support brackets 168 and 179 each include an inwardly extending boss 196. The upward ends of each boss 196 define an arcuately extending cam surface 198 which preferably has a concave, circular-shaped profile having an open end which faces upwards for receiving a follower member 200. The follower members 200 are preferably rigid extensions of the waste receptacle 116 which fit within the cam surface 198 of the boss 196 in a rotating engagement. Hinge pins 146 fit within respective ones of the hinge pin holes 202 in the follower members 200 and the hinge pin holes 194 in the respective ones of the support brackets 168 and 170. The enclosure 204 has an upper surface 206 defining a top side thereof, sidewalls 210, and an open lower end 212. The lower end 212 is preferably sized for fitting over the mechanical linkage mechanism 172 and the platform 164. An aperture 208 is centrally disposed in the upper surface 206 and shaped with a profile for receiving a lowermost end of the waste receptacle 116. Two formed rails 214 are mounted to the enclosure 204 and extend above it to define arm rests for a user when disposed on the portable toilet 112. The formed rails 214 are preferably arcuately shaped into a generally U-shaped configuration.

A platform 164 is provided by a plate which is sized for being movable received in the lower end 212 of the enclosure 204. Four wheels 166 are mounted to the platform and extend from a bottom side thereof. Preferably the wheels 166 may be locked to prevent movement of the portable toilet during use. A reservoir 136 and a pump unit 138 with a power source 140 are mounted to the upper side of the platform 164 to provide a water supply. The power source may be provided by a battery pack or by an electric cord for connecting to a building power outlet. The scissor linkage mechanism 172 is preferably rigidly mounted to the top side of the platform 164 and the underside of the top surface 206 of the enclosure 204.

Figure 17:
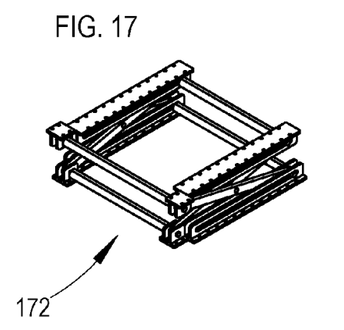
FIG. 17 is a perspective view of a mechanical linkage mechanism provided by a scissor style linkage which is shown in a downward position.
Figure 18:
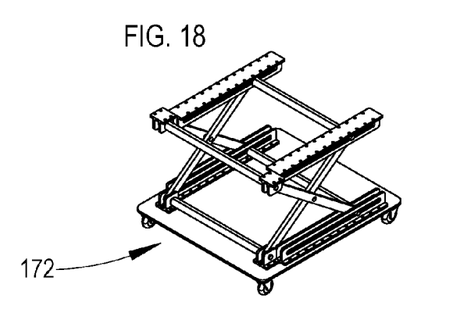
FIG. 18 is a perspective view of the mechanical linkage mechanism shown in an upward position.
Figure 19:
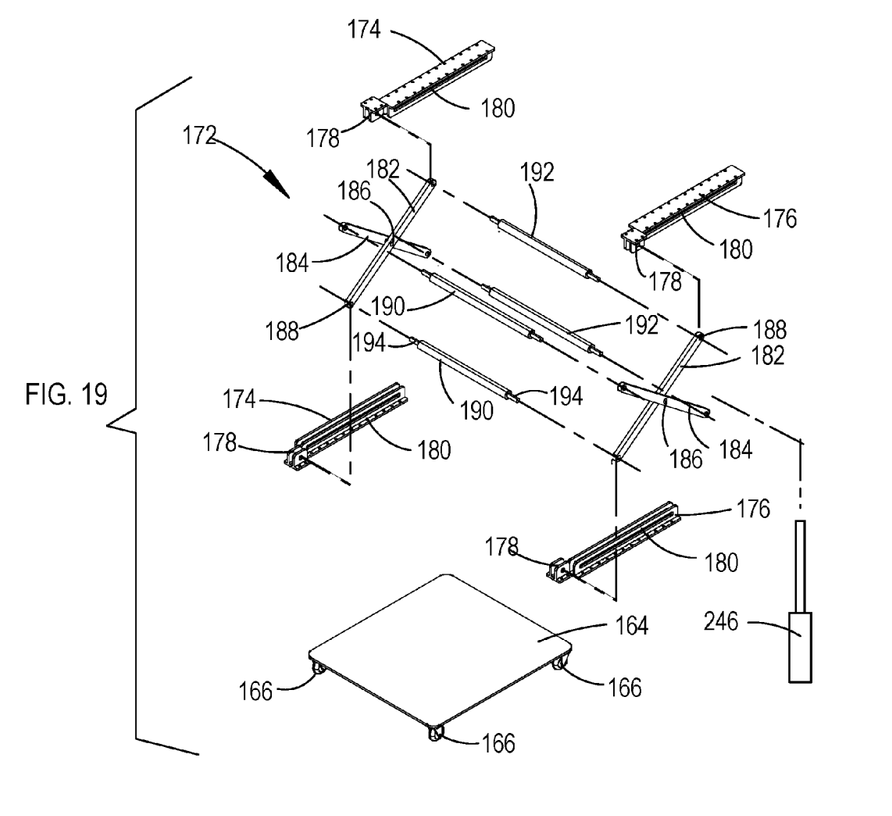
FIG. 19 is an exploded, perspective view of the mechanical linkage mechanism.

FIG. 17 is a perspective view of a mechanical mechanism 172 shown in a downward position, FIG. 18 is a perspective view of the mechanical mechanism 172 shown in an upward position, and FIG. 19 is an exploded, perspective view of the mechanical mechanism 172. The mechanical mechanism 172 is preferably a scissor style linkage assembly which maintains the upper surface of the waste receptacle 116 in a horizontal position when lifted to raised position, prior to rotating the waste receptacle 116 to empty its contents into the building toilet 154. The scissor linkage mechanism 172 has two types of mounting brackets 174 and 176, each having parallel rails which define tracks for receiving sliding ends of elongate arms 182 and 184. Two pairs of the elongate arms 182 and 184 are pivotally connected by the pivot pins 186 and define opposed pairs of scissor arms, which are disposed in opposed relation. Forward ends of respective ones of the mounting brackets 174 and 176 each include a clevis 178 which provide yokes for receiving and pivotally securing the forward ends of the elongate arms 182 and 184. The two stationary rods 190 each have longitudinally extending pins 194 for fitting into the clevises 178 and pivotally mounting the forward ends of the elongate arms 182 and 184 to the clevises 178. The mounting brackets 174 and 176 each have opposed pin slots 180 which extend rearward for slidable receiving outward pins 194 of the sliding rods 192. The pins 194 of the sliding rods 192 preferably secure the rearward ends of the elongate arms 182 and 184 in the tracks defined by the rearwardly extending rails of the mounting brackets 174 and 176. Opposite ends of each of the elongate arms 182 and 184 each have pin apertures 188 for slidably receiving the pins 194 of the stationary rods 190 and the sliding rods 192.

Figures 20, 21, 22:
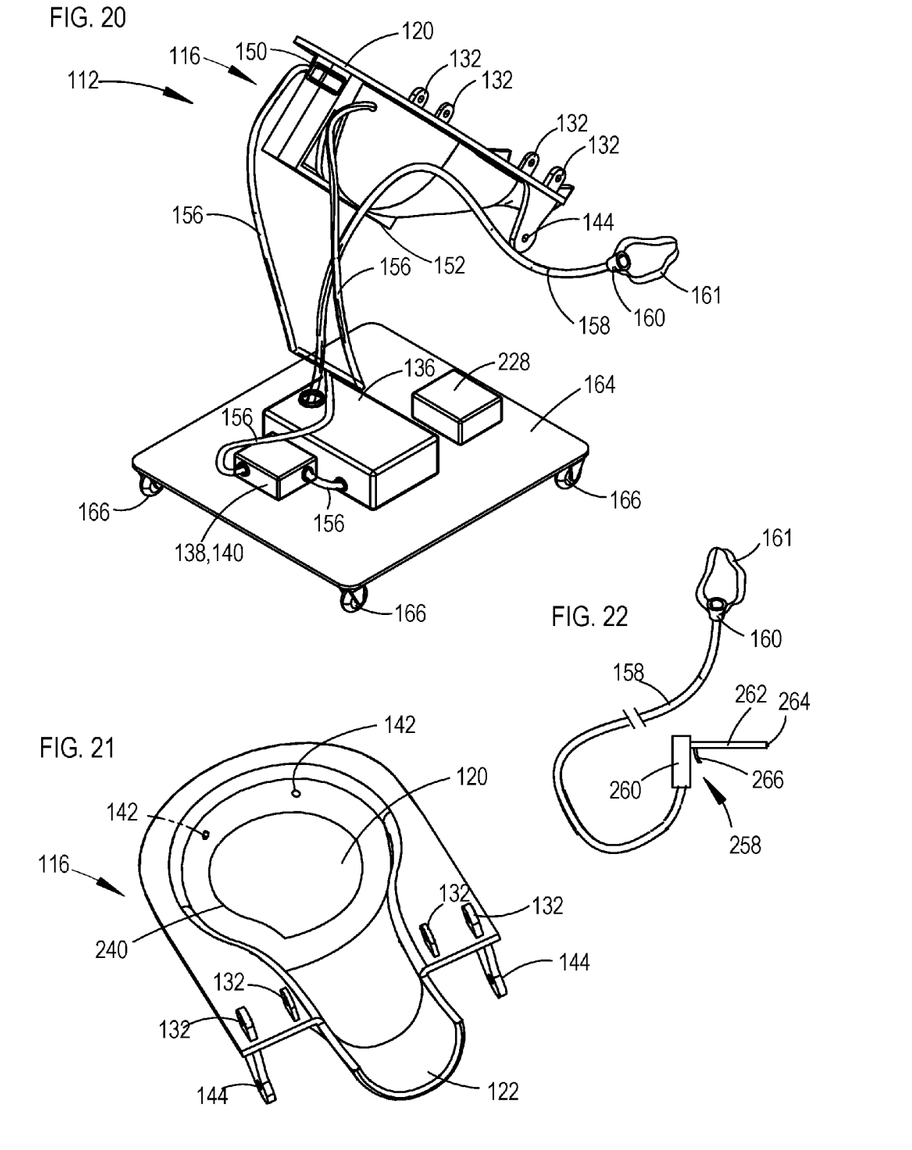
FIG. 20 is a partial perspective view of the portable toilet, showing the waste receptacle and the water supply components.
FIG. 21 is a perspective view of the waste receptacle showing flow ports for supplying fluid for rinsing waste from the bowl of the waste receptacle.
FIG. 22 is a perspective view of a spray gun with a hose and connector adapter for cleaning debris from the bowl of the portable toilet.

FIG. 20 is a partial perspective view of the portable toilet 112, showing the waste receptacle 116 and water supply components such as a water storage tank 136, an electric pump 138 and a power source 140, such as a battery pack for operating the pump to pass water into the bowl 120 for swirling in the bowl 120 to clean the contents therefrom. Tubing 158 provides a supply hose having a flexible end connector 160 and elastic loop 161 for connecting to a building water faucet, such as used for a sink or a bath tub, to pass water through the tubing 158 and into the storage tank 136. Tubing 166 connects the tank 136 to the pump 138 and to flow nozzles 142 in the bowl 120.

FIG. 21 is a perspective view of the waste receptacle 116 showing flow ports provided by the flow nozzles 142. Water is passed through the tubing 158 and then to the flow nozzles 142 for swirling in the bowl and rinsing waste and other debris from the bowl 120 into the conventional building toilet 154. A fill line 240 is provided by an line which is either embossed on or formed into the inner surface of the bowl portion 20 of the waste receptacle 116. The fill line 240 represents the line to which a user manually fills the bowl 120 with water prior to using the portable toilet 112 for receiving waste.

FIG. 22 is a perspective view of a spray gun 258 with a hose 158 and connector adapter 160 with an elastic loop for fastening to a building water faucet. The spray gun 258 is provided for cleaning debris from the bowl 120 of the portable toilet 112. The spray gun has a grip handle 260 with an adapter for connecting to a terminal end of the hose 158. A barrel 262 extends outward of the grip handle 260 with a spray nozzle 264 on the terminal end, opposite the grip handle 260. An actuator is provided by a trigger 266 which is actuated by a user pulling back on the trigger to spray fluid therefrom. In other embodiments, a push button actuator or the like may be provided. In other embodiments the longitudinal length grip handle 260 may be parallel to the longitudinal axis of the barrel 262, rather than being at the right angle as shown for spray gun 258 in FIG. 22.

In operation, an attendant or care giver will preferably place the portable toilet 112 in the lowered position for use, and then the wheels 166 will be locked to prevent the portable toilet 112 from moving during use. After use, the wheels 166 are unlocked, the portable toilet 112 is moved adjacent to the building toilet 154 to locate the bowl 120 adjacent to a conventional building toilet 154, with the rearward terminal end of the stop 220 engaging the forward end of the building toilet 154 and providing a gauge of the distance there-between. The portable toilet is then raised to a height to position the pour spout 122 above a bowl of a building toilet. Then, the waste receptacle 116 is rotated about the horizontal axis 162 to spill the contents of the receptacle 116 into the conventional toilet. The water supply is then actuated to pass water through the flow nozzles 142 and rinse the bowl 120 of the waste receptacle 116, with water from the spray nozzles 142 preferably swirling around the bowl 120. The spray gun 258 may then be used to clean any difficult debris from the bowl 120 and spout 122 of the waste receptacle 116.

The present invention provides a portable toilet having waste receptacle defining a bowl which is pivotally mounted for rotating about a horizontal axis to spill the contents of the bowl into a conventional building toilet. This allows an attendant or care giver to spill the contents of the bowl without having to touch the contents of the bowl. Water will then be passed to the bowl and swirl to clean the bowl with waste spilling from the portable toilet into a conventional building toilet. The water is preferably supplied by an onboard water supply. The upper surface of the seat and the top of the waste receptacle are normally disposed, with the waste receptacle in a downward position, at an angle to the horizontal increasing in height in a rearward direction such that the pivot point of the waste receptacle will be taller than the forward end of a conventional, fixed building toilet to allow the waste receptacle tilt above the front of the building toilet and spill the contents of the waste receptacle bowl into the building toilet. The angle of incline of the upper surface of the seat and the top of the waste receptacle preferably provides that the forward end of the seat and the waste receptacle are at a normal height for a person to comfortable sit into the forward end of the portable toilet. In a second embodiment, a scissor style mechanical linkage mechanism is provided to raise the waste receptacle from a lower position for a person to use to a raised position for positioning the waste receptacle for spilling the contents thereof into the conventional building toilet.

The first and second embodiments of portable toilets may be manually operated to spill the contents thereof by a user manually lifting the front of the waste receptacles to pivot, or tilt, the waste receptacle above a fixed building toilet to spill the contents of the waste receptacles into the building toilet. Enhanced options are disclosed for each of the embodiments to provide powered mechanisms such as linear actuators, motor powered rack and pinion systems, and the like, to automatically pivot, or tilt, the waste receptacles and activate power flushing water sprays or cleaning solutions at the push of button.

Although the preferred embodiment has been described in detail, it should be understood that various changes, substitutions and alterations can be made therein without departing from the spirit and scope of the invention as defined by the appended claims.

What is claimed is:

1. A portable toilet comprising:
    a waste receptacle defining a bowl for receiving waste;
    a frame to which said waste receptacle is pivotally mounted, said frame configured to dispose said waste receptacle in a downward position for use as a toilet in conventional fashion,
    said waste receptacle having a pour spout defined to extend from a rearward end of said waste receptacle for emptying contents of said waste receptacle; and
    wherein said waste receptacle is pivotally mounted to said frame to allow a forward end of said waste receptacle to be lifted from said downward position to an upwards position to spill the contents of said waste receptacle into a conventional building toilet.

2. The portable toilet according to claim 1, further comprising a linear actuator mounted to said frame and extending to said waste receptacle for moving said waste receptacle from said downward position to said upwards position.

3. The portable toilet according to claim 1, further comprising:
    a fluid reservoir mounted to said frame;
    spray nozzles mounted to said waste receptacle for passing fluid through said waste receptacle to clean the contents therefrom; and
    a pump in fluid communication with said fluid reservoir and spray nozzles, said pump being operable to pump fluid from said fluid reservoir through said spray nozzles.

4. The portable toilet according to claim 1, further comprising a control unit and a control panel for automating operation of said portable toilet, wherein said control unit includes a power supply and is operable for automatically lifting said waste receptacle from said downward position to said upwards position, and then returning said waste receptacle to said downward position.

5. The portable toilet according to claim 4, further comprising:
    a fluid reservoir mounted to said frame;
    spray nozzles mounted to said waste receptacle for passing fluid through said waste receptacle to clean the contents therefrom;
    a pump in fluid communication with said fluid reservoir and spray nozzles, said pump being operable to pump fluid from said fluid reservoir through said spray nozzles; and
    wherein said control unit automatically operates said pump for passing fluid through said spray nozzles.

6. The portable toilet according to claim 5, further comprising a linear actuator which is selectively powered by said control unit to lift and then lower said waste receptacle form between said downward position and said upward position.

7. The portable toilet according to claim 1, further comprising a mechanical mechanism for maintaining an upper surface of the waste receptacle in a horizontal position.

8. The portable toilet according to claim 7, wherein the mechanical mechanism comprises a scissor style linkage assembly.

9. The portable toilet according to claim 1, further comprising a water flush system which includes a water supply and nozzles mounted to said waster receptacle for cleaning the contents from said waste receptacle.

10. The portable toilet according to claim 9, further comprising:
    a fluid reservoir mounted to said frame;
    said nozzles mounted to said waste receptacle for passing fluid through said waste receptacle to clean the contents therefrom; and a pump in fluid communication with said fluid reservoir and nozzles, said pump being operable to pump fluid from said fluid reservoir through said spray nozzles.

11. A portable toilet comprising:
a waste receptacle having a first portion defining a bowl for receiving waste, and a second portion defining a pour spout for pouring contents of said bowl therethrough;
a frame to which said waste receptacle is pivotally mounted, such that said waste receptacle is pivotally moveable from a downward position for use by persons as a toilet, to an upward position in which the contents of said bowl is poured through said pour spout and from said waste receptacle;
a fluid reservoir mounted to said frame;
said nozzles mounted to said waste receptacle for passing fluid through said waste receptacle to clean the contents therefrom; and
a pump in fluid communication with said fluid reservoir and nozzles, said pump being operable to pump fluid from said fluid reservoir through said spray nozzles.

12. The portable toilet according to claim 11, further comprising a control unit and a control panel for automating operation of said portable toilet, wherein said control unit includes a power supply and is operable for automatically lifting said waste receptacle from said downward position to said upwards position, and then returning said waste receptacle to said downward position.

13. The portable toilet according to claim 12, further comprising a linear actuator which is selectively powered by said control unit to lift and then lower said waste receptacle form between said downward position and said upward position.

14. The portable toilet according to claim 11, further comprising a seat mounted to said frame, said seat being disposed above said bowl of said waste receptacle at least when said waste receptacle is disposed in said downward position.

15. The portable toilet according to claim 14, wherein an upper surface of said seat is at an angle to horizontal, rising in elevation in extending in a direction form said bowl to said pour spout.

16. The portable toilet according to claim 15, wherein said angle to the horizontal is approximately twelve degrees.

17. The portable toilet according to claim 11, further comprising a mechanical mechanism for maintaining an upper surface of the waste receptacle in a horizontal position.

18. The portable toilet according to claim 17, wherein the mechanical mechanism comprises a scissor style linkage assembly.

* * * * *